Dec. 31, 1968 MITSURU OIKAWA ET AL 3,419,327

XEROGRAPHIC REPRODUCING APPARATUS

Filed June 29, 1966 Sheet 1 of 2

PRIOR ART

INVENTORS
MITSURU OIKAWA
MAKOTO TANAKA
KAZUYOSHI KAWAFUNE
KEIJI YOSHIDA
HISASHI YAMANAKA

BY Paul M. Craig, Jr.
ATTORNEY

Dec. 31, 1968 MITSURU OIKAWA ET AL 3,419,327

XEROGRAPHIC REPRODUCING APPARATUS

Filed June 29, 1966 Sheet 2 of 2

INVENTORS
MITSURU OIKAWA
MAKOTO TANAKA
KAZUYOSHI KAWAFUNE
KENJI YOSHIDA
HISASHI YAMANAKA

BY Paul M. Craig, Jr.
ATTORNEY

United States Patent Office 3,419,327

Patented Dec. 31, 1968

3,419,327

XEROGRAPHIC REPRODUCING APPARATUS

Mitsuru Oikawa, Tokyo, Makoto Tanaka, Musashino-shi, Kazuyoshi Kawafune, Tokyo, and Keiji Yoshida and Hisashi Yamanaka, Kawasaki-shi, Japan, assignors to Hitachi, Ltd., Tokyo, Japan, a corporation of Japan Filed June 29, 1966, Ser. No. 561,515
Claims priority, application Japan, July 9, 1965, 40/55,833
2 Claims. (Cl. 355—8)

Figure 1:
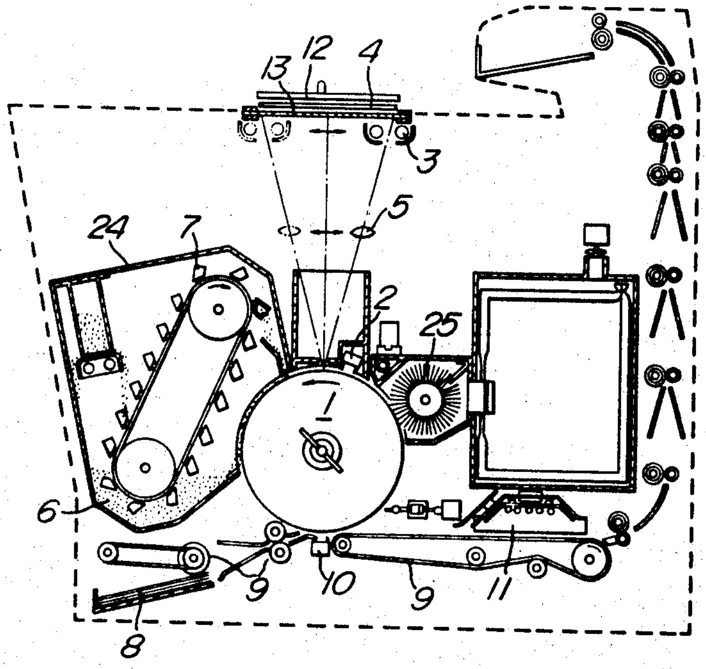

The present invention relates generally to xerograph, and more particularly to an improved xerographic reproducing apparatus. Still more particularly, the present invention relates to an improved xerographic reproducing apparatus for efficiently obtaining xerographic reproductions from a fixed original object.

The term "xerographic reproducing apparatus," herein referred to, points to an apparatus as is described, for example, in the specification of either the U.S. Patent No. 2,297,691 dated Oct. 6, 1942, to C. F. Carlson or U.S. Patent No. 2,357,809 dated Sept. 12, 1944.

These xerographic reproducing apparatuses of the prior art have been constructed based on the following principles: that (1) a xerographic plate prepared by forming a thin layer of photoconductive insulator such as amorphous selenium on a conductive substratum such as aluminium by evaporation or coating, is charged up in a dark place, and (2) this xerographic plate is exposed to light which is reflected from the original object. Whereupon, the surface potential of the charged plate decays in proportion to the amount of the light received by the xerographic plate to form thereon an electrostatic latent image which is identical in dimension and pattern to the original object. Next (3), an amount of fine powder which has been reversely charged up relative to the charge on the xerographic plate (said charged powder will hereinafter be called "toner") is brought into contact with the surface of the latter plate. At this moment, the toner is attracted thereto in proportion to the amount of the residual charge of the xerographic plate and there occurs the phenomenon that a positive image is produced from a positive. Also, by using a toner charged homologously with the xerographic plate, there occurs the phenomenon that a negative image is developed from a positive. And next (4), the image of the original object thus developed on the xerographic plate is transferred onto a sheet of paper and the transferred image on this paper is settled by heat-melting, with the result that an image having the same pattern as the original object is reproduced on the paper.

The present invention contemplates providing a xerographic reproducing apparatus which is an advanced and improved type of a conventional xerographic reproducing apparatus which has been constructed based on the aforestated principles.

It is, therefore, the primary object of the present invention to provide an improved xerographic reproducing apparatus which can automatically reproduce an original object at a high speed with accuracy and at a low cost and which accordingly is most suited for use in general reproducing purposes in business offices, manufacturing industries, commercial fields, or in the planning of decorations or in designing.

Another object of the present invention is to provide a xerographic reproducing apparatus which accomplishes reproductions rapidly with little mechanical impact in the apparatus arising during the operation and which accordingly is free from becoming out of order.

Figure 2:
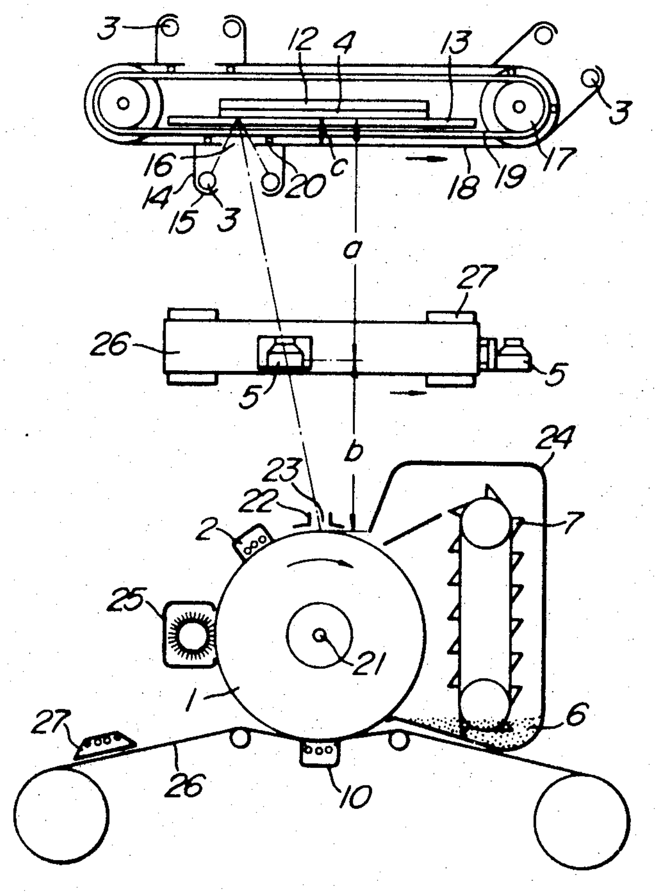

Other objects, features, structure and advantages of the present invention which are not seen in conventional xerographic reproducing apparatuses will be more clearly understood by reading the following descriptions in conjunction with the accompanying drawings, in which:

FIG. 1 is a somewhat diagrammatic cross sectional view of a typical conventional xerographic reproducing apparatus; and FIG. 2 is a somewhat diagrammatic cross sectional view of the xerographic reproducing apparatus of the present invention, showing the structural outline of the invention.

Description will first be made on the structure and functions of the conventional xerographic reproducing apparatus. A typical example of the conventional xerographic reproducing apparatus is most clearly disclosed in the U.S. Patent No. 3,062,109 dated Nov. 6, 1962, to Clyde C. Mayo. His invention is briefly illustrated in FIG. 1. In this drawing, reference numeral 1 represents a rotary xerographic drum which is driven by an electric motor. A thin layer of a photo-conductive material, such as amorphous selenium, is formed by evaporation or coating on an electro-conductive film such as aluminum which has been formed on the surface of the drum. Numeral 2 represents a corona charging means for charging the aforesaid surface of the drum by virtue of corona discharge. Numeral 3 represents a light source for illuminating an original object to be reproduced. The light reflected from this original object is focused by a lens 5 and is projected onto the charged surface of the drum to form thereon a charged latent image. Numeral 6 represents a toner which is sprinkled uniformly, by mean of a bucket conveyor 7, on the drum surface on which a charged latent image has been formed, to develop said latent image. Numeral 8 represents a sheet of paper which is fed by a feeding mechanism 9. The image which has been thus developed on the surface of the drum is then transferred onto the sheet of paper by means of a transfer means 10. The transferred image is then subjected to a heater 11 to settle the image on said sheet of paper by heat-melting.

In this conventional apparatus, the light source 3, the lens system 5 and the drum 1 are driven in synchronism. It is, however, necessary that both the light source 3 which illuminates the object once for each reproduction cycle and the lens system 5 make reciprocating movements, respectively. Since a reproduction is carried out during one course of travel or only during the forwarding movement of both the light source and the lens system, the reproducing apparatus of the conventional type has, as is readily understood, an inherent defect that relatively much time is wasted. Furthermore, at each turn of the direction of movement of the lens system 5, the latter is subjected to a great deal of impact which in turn causes undue mechanical strains on the lens system. Thus, the conventional apparatus is of another defect that it is quite difficult to operate the apparatus at a high speed and to obtain a number of reproductions in a short length of time.

The present invention contemplates providing an improved xerographic reproducing apparatus which performs reproductions at a high speed, at a low cost, with high precision and without the occurrence of any mechanical impact in the apparatus, all of which have been impossible with a conventional xerographic reproducing apparatus, by driving both the means for projecting a slit light on the image which is carried on the original object and the lens system so that they travel in one direction along the endless orbit and also by driving the light projecting means, the lens system and the rotary drum (with respect to the peripheral velocity) in synchronism in a predetermined correlationship between them.

The structure of the present invention will now be described by referring to FIG. 2. It is to be understood that like parts in both FIG. 1 and FIG. 2 which are used for the same purposes are indicated by like reference numerals.

In FIG. 2, reference numeral 12 represents an original object supporting member; numeral 13 represents a transparent glass plate for holding the original object 4 on said supporting member 12. Numeral 14 represents a light source means with slit comprising a light source 3, a reflector 15 and a slit 16 and being operable so as to focus the light radiating from the light source 3 by the reflector 15 and to project the focused light onto the surface of the original object through the slit 16. A plurality of such light source means 14 are attached at predetermined intervals to an endless belt 18 which is disposed so as to be driven by a pulley 17 to travel in the direction of the arrow around the opposite surfaces of the original object supporting member 12. Numeral 19 represents a guide rail for insuring the light source means with a slit to slide positively thereon and for preventing them from being accidentally displaced from the predetermined positions. Numeral 20 represents a guide roller for insuring the light source means with slit to travel smoothly on said guide rail 19. Numeral 1 represents a rotary xerographic drum which is rotated in the direction of the arrow and which has a periphery formed with an electrostatic photosensitive material in the same fashion as that used in a conventional xerographic reproducing apparatus. The photosensitive surface of said drum is disposed to face said original object supporting member 12 at an appropriate distance, while the rotational axis 21 of said drum is supported in parallel with the axis of the pulley 17 which is operable for driving the endless belt 18. Numeral 22 represents a fixed frame of a slit for restricting the exposure area of the surface of said rotary xerographic drum 1. Numerals 2, 24 and 10 represent, respectively, a corona charging means, a developing means, and a transfer means which are disposed respectively so as to face the circumference of the rotary xerographic drum. As far as these members are concerned, there is no apparent difference from those members used in the conventional xerographic reproducing apparatus as is shown in FIG. 1. The electrostatic photosensitive material located on the periphery of the rotary xerographic drum 1 is charged by the corona charging means 2, and the charged material is exposed to light through the slit 23, and then the exposed material is developed by the developing means 24, and thereafter the developed image is transferred onto a paper by the transfer means 10. Numeral 25 represents a cleaning means for completely wiping away the toner deposited on the periphery of the drum 1 to insure that the periphery is uniformly charged. Numeral 5 represents a lens. A plurality of such lenses, as many as the light source means 14, are attached at predetermined intervals to the surface of the endless belt 26 which is disposed between the original object supporting member 12 and the portion of the periphery of said xerographic drum 1 which is to be exposed to light. These lenses are made to travel with the endless belt which is driven by the pulley 27, the lenses travelling in parallel with respect to the original object 13 and in the direction of the arrow.

The most important points of the apparatus of the present invention which are distinguished from the conventional apparatus as shown in FIG. 1 will be described in detail. The velocity $V_S$ of the travelling light source means which is attached to the surface of the endless belt 18; the travel velocity $V_L$ of the travelling lens 5 which is attached onto the endless belt 26; and the peripheral velocity $V_P$ of the rotary xerographic drum, are adapted to be synchronous relative to each other by means of, for example, a gear mechanism (not shown) and these have the relationship of:

$$\frac{V_S}{V_L}=\frac{a}{b}+1 \quad (1)$$

$$\frac{V_P}{V_L}=\frac{b}{a}+1 \quad (2)$$

and the travelling slit 16, the travelling lens 5 and the fixed slit 23 are also synchronous so that these latter three are to be disposed always on one linear line. In the above equations, letter $a$ represents the distance between the original object 4 and the lens 5; letter $b$ represents the distance between the lens 5 and the photosensitive surface of the xerographic drum 1. In practice, however, the distance $c$ between the slit 16 and the original object 4 is very small as compared with the distance $a$ and the distance $b$, and as a consequence, this distance $c$ may be disregarded altogether. Assuming now that the locus of the face of the travelling lens 5 is located at the position of $a=b$, the travelling velocity $V_S$ of the slit 16 will, from the Equations 1 and 2, be equal to the peripheral velocity $V_P$ of the xerographic drum 1, and as a result, the lens 5 is driven at the speed of ½ the velocity of the travelling slit 16 and also at the speed of ½ the peripheral velocity of the xerographic drum 1. Thus, upon the completion of the scanning of the path of the projected light by both the slit 16 and the lens 5, an image of the same magnitude with the original object 4 is reproduced on the surface of the electrostatic photosensitive material located on the periphery of the xerographic drum. If another light source with a slit 16 and another lens 5 are provided on the endless belts 18 and 26, respectively, in such fashion that they are brought, simultaneously with the completion of the scanning, to the position at which the scanning of the path of the projected light is about to be started, then the periphery of the xerographic drum 1 will have continuous regions of exposures. These continuously exposed regions are then developed by the developing means 24, and thereafter the developed regions are transferred onto the tape 26, and the tape is then subjected to the heating means 27 for being settled by heat. The result is that reproductions are obtained continuously at a high speed.

In short, the apparatus of the present invention is of the structure which is featured firstly in that the light source means 14 and the lens 5 are attached to their corresponding belts, respectively, to be driven only in one direction and they do not travel both ways, so that the impact which has been imposed upon the lens and its associated portions of the conventional apparatus is eliminated by the use of the apparatus of the present invention, and as a result, the apparatus of the present invention is completely free from becoming out of order, and furthermore, it is possible to effect a high speed drive of the light source means 14 and the lens 5. Secondly, the apparatus of the present invention is so arranged that the light source means 14, and lens 5 and the periphery of the xerographic drum 1 are synchronized in such correlationship as is shown in the Equations 1 and 2, and that the travelling slit 16, the lens 5 and the fixed slit 23 are disposed on the path of the projected light, and also that with the scanning having been performed to the end point, the next slit 16 and the next lens 5 are there already positioned at the point of starting the scanning of the original object, and therefore, one original object is continuously reproduced at a high speed, which means a remarkable economy of time.

What is claimed is:

1. Xerographic reproducing apparatus comprising a rotary xerographic drum having a periphery formed with an electrostatic photosensitive material, a light source, a lens, and a corona charging means, said apparatus being operable in such fashion that said periphery of said drum is uniformly charged by said corona charging means, thereafter an original object is illuminated with a light from said light source, and the light reflected from said original object is focused by said lens and projected onto the periphery of said rotary drum to sensitize said periphery and to thereby form an electrostatic latent image thereon, thereafter a toner is sprinkled onto the surface of said xerographic drum carrying said electrostatic latent image to develop said image, subsequently the resulting developed image carried on the periphery of said xerographic drum is transferred onto a sheet of paper, and thereafter said transferred image on the paper is settled by heat-melting, characterized by the provision of: a plurality of light source means with slit, each light source means with slit comprising a light source, a reflector and a slit, each being attached to an endless belt driven to travel around the opposite surfaces of an original object supporting member; a fixed slit disposed close to the periphery of said rotary xerographic drum to be exposed to light and facing said periphery; and a plurality of lenses attached to an endless belt, said belt being driven to travel between said original object supporting member and said fixed slit, said plurality of light sources with slit, said fixed slit and said plurality of lenses and light source means being driven synchronously.

2. Xerographic reproducing apparatus according to claim 1, wherein said apparatus is so arranged that said light source with slit, said lens and said rotary xerographic drum are driven synchronously while the travel velocity $V_S$ of said light source with slit, the travel velocity $V_L$ of said lens, the peripheral velocity $V_P$ of said rotary xerographic drum, the distance *a* between the original object and the lens, and the distance *b* between the lens and the exposure surface of the rotary xerographic drum are in the following relationship:

$$\frac{V_S}{V_L}=\frac{a}{b}+1 \text{ and } \frac{V_P}{V_L}=\frac{b}{a}+1$$

References Cited

UNITED STATES PATENTS 3,162,105 12/1964 Moyroud ----------- 95—4.5

JOHN M. HORAN, *Primary Examiner.*

U.S. Cl. X.R.

355—11